(12) United States Patent
Brost et al.

(10) Patent No.: US 8,728,671 B1
(45) Date of Patent: May 20, 2014

(54) AIR ELECTRODES INCLUDING PEROVSKITES

(71) Applicant: Zinc Air Fuel Cells, Inc., Columbia Falls, MT (US)

(72) Inventors: Ronald D. Brost, Whitefish, MT (US); Adam Weisenstein, Whitefish, MT (US); Kristine M. Brost, Whitefish, MT (US); Howard F. Wilkins, Kalispell, MT (US); Randolph M. Kosted, Kalispell, MT (US)

(73) Assignee: ZAF Energy Systems, Incorporated, Columbia Falls, MT (US)

( * ) Notice: Subject to any disclaimer, the term of this patent is extended or adjusted under 35 U.S.C. 154(b) by 0 days.

(21) Appl. No.: 13/910,658

(22) Filed: Jun. 5, 2013

(51) Int. Cl.
*H01M 12/06* (2006.01)

(52) U.S. Cl.
USPC .......................................................... 429/405

(58) Field of Classification Search
None
See application file for complete search history.

(56) References Cited

U.S. PATENT DOCUMENTS

| | | | |
|---|---|---|---|
| 4,535,067 A | 8/1985 | Courty et al. | |
| 4,762,961 A | 8/1988 | Guttmann et al. | |
| 5,185,218 A | 2/1993 | Brokman et al. | |
| 5,494,700 A | 2/1996 | Anderson et al. | |
| 6,368,751 B1 | 4/2002 | Yao et al. | |
| 7,157,165 B2 | 1/2007 | Ralph et al. | |
| 7,887,956 B2 | 2/2011 | Wang Chen | |
| 8,124,037 B2 | 2/2012 | Jain et al. | |
| 2006/0216575 A1 | 9/2006 | Cassidy | |
| 2007/0065701 A1 | 3/2007 | Cable et al. | |
| 2007/0166602 A1* | 7/2007 | Burchardt ....................... 429/44 |
| 2011/0114496 A1* | 5/2011 | Dopp et al. ................... 205/109 |
| 2012/0040254 A1* | 2/2012 | Amendola et al. ............ 429/406 |
| 2012/0251923 A1 | 10/2012 | Seo et al. | |

FOREIGN PATENT DOCUMENTS

KR 20120070728 A 7/2012

OTHER PUBLICATIONS

Neburchilov et al., A review of air cathodes for zinc-air cells, Journal of Power Sources 195 (2010) 1271-1291.*
Narayanan et al., Material challenges and technical approaches for realizing inexpensive and robust iron-air batteries for large-scale energy storage, Solid State Ionics 216 (2012) 105-109.*
Churl Kyoung Lee et al., Thermal Treatment of La0.6Ca0.4CoO3 Perovskites for Bifunctional Air Electrodes, J. Electrochem. Soc., vol. 144, No. 11, Nov. 1997, pp. 3801-3806.
P. Karen et al., Electronic, Magnetic and Structural Properties of A2VMoO6 Perovskites, Journal of Solid State Chemistry 179 (2006), pp. 2120-2125.
Xianyou Wang et al., Studies on the Oxygen Reduction Catalyst for Zinc-Air Battery Electrode, Journal of Power Sources 124 (2003), pp. 278-284.

(Continued)

*Primary Examiner* — Patrick Ryan
*Assistant Examiner* — Jose Colucci Rios
(74) *Attorney, Agent, or Firm* — Brooks Kushman P.C.

(57) ABSTRACT

A positive electrode may include an electrically conductive scaffold, conductive catalytic A-site deficient perovskite particles chemically bonded to the scaffold, an ion and gas permeable ionomer connecting the particles, and a hydrophobic porous layer on the scaffold. A secondary air electrode may include conductive bi-functional catalytic A-site deficient perovskite particles including $A^{I}$-site lanthanum cations and $A^{II}$-site alkaline earth metal cations, an ion and gas permeable ionomer connecting the particles, and a conductive scaffold in electrical contact with the particles.

23 Claims, 2 Drawing Sheets

(56) References Cited

OTHER PUBLICATIONS

O. Haas et al, X-Ray Absorption and Diffraction Studies of La0.6Ca0.4CoO3 Perovskite, A Catalyst for Bifunctional Oxygen Electrodes, Electrochimica Acta 47 (2002), pp. 3211-3217.

Michael M. A. Sekar et al., Low-Temperature Synthesis, Characterization, and Properties of Lead-Based Ferroelectric Niobates, J. Am. Ceram. Soc., 81 (2) (1998), pp. 380-388.

Alexander S. Mukasyan et al., Perovskite Membranes by Aqueous Combustion Synthesis: Synthesis and Properties, Separation and Purification Technology 25 (2001), pp. 117-126.

Abdul Majid et al., Preparation of SrFeO 2.85 Perovskite Using a Citric Acid Assisted Pechini-Type Method, Journal of Alloys and Compounds 398 (2005), pp. 48-54.

A. Aguadero et al., Study of the Crystal Structure, Thermal Stability and Conductivity of $Sr(V0.5Mo0.5)O_{3+\delta}$ as SOFC Material, Fuel Cells 11 No. 1 (2011), pp. 44-50.

A.J. Weisenstein et al., Processing and Characterization of $Sr_{2-x}VMoO_{6-\delta}$ Double Perovskites, Materials Chemistry and Physics xxx (2013), pp. 1-13.

Jin Suntivich et al., Design Principles for Oxygen-Reduction Activity on Perovskite Oxide Catalysts for Fuel Cells and Metal-Air Batteries, Nature Chemistry, vol. 3, Jul. 2011, www.nature.com/naturechemistry, pp. 546-550.

Nae-Lih Wu et al., Effect of Oxygenation on Electrocatalysis of $La0.6Ca0.4CoO_{3-x}$ in Bifunctional Air Electrode, Electrochimica Acta 48 (2003), pp. 1567-1571.

\* cited by examiner

AIR ELECTRODES INCLUDING PEROVSKITES

TECHNICAL FIELD

This disclosure relates to electrodes for metal-air batteries.

BACKGROUND

A metal-air battery may include a metal negative electrode and an air positive electrode. Oxygen, which is a strong oxidizing agent, light in weight, and normally available everywhere, is the active material of the air electrode. Since the oxygen is supplied from outside the battery, the interior of the battery can be primarily used to accommodate the negative electrode material. This may give metal-air batteries a large energy capacity.

The requirements for a negative electrode material may include a negative redox potential or strong reducing power, a low molecular weight, and a large valence change during discharge. Candidates include lithium, aluminum, cadmium, cobalt, magnesium, zinc and iron.

SUMMARY

A secondary air electrode includes conductive bi-functional catalytic A-site deficient perovskite particles including $A^I$-site lanthanum cations and $A^{II}$-site alkaline earth metal cations, an ion and gas permeable ionomer connecting the particles, and a conductive scaffold in electrical contact with the particles.

A positive electrode includes an electrically conductive scaffold, conductive catalytic A-site deficient perovskite particles chemically bonded to the scaffold, an ion and gas permeable ionomer connecting the particles, and a hydrophobic porous layer on the scaffold.

DETAILED DESCRIPTION

Figure 1:
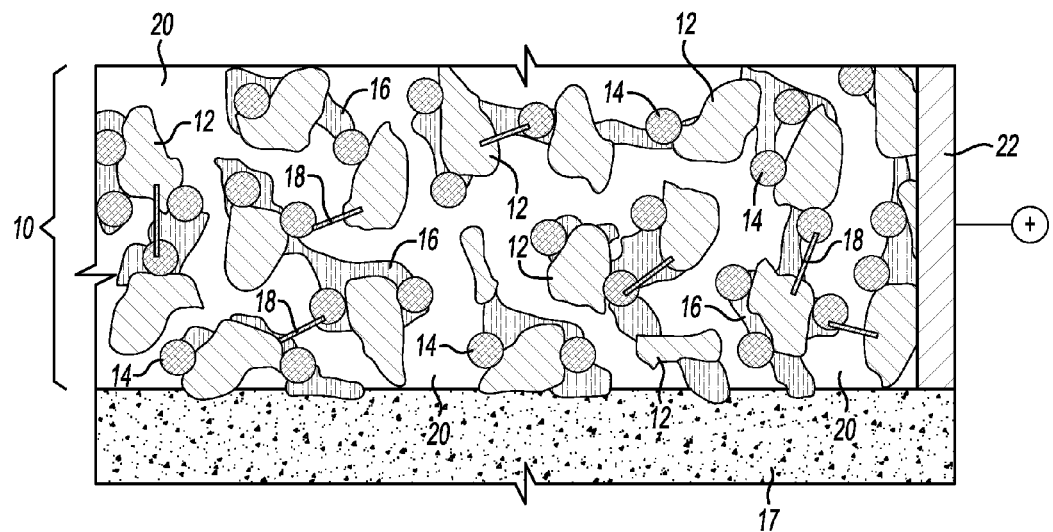
FIG. 1 is a section of a conductive perovskite catalyst structure of a bi-functional air electrode and adjacent bulk electrolyte.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Perovskites are inorganic complex oxides with the empirical formula $ABO_3$. The A-site cations are typically rare earth metal ions or alkali earth metal ions, and the B-site cations are typically transition metals with mixed valence states. Also, the 'A' atoms are larger than the 'B' atoms. Mixed A-site perovskites are also known (empirical formula $A^I A^{II} BO_3$). The $A^I$-site cations are typically rare earth metals, the $A^{II}$-site cations are typically alkali earth metals, and the B-site cations are typically transition metals with mixed valence states. Moreover, stoichiometric manipulation of the A-site elements ratio can produce A-site deficient perovskites.

Certain perovskites exhibit catalytic activity, particularly with regard to primary and/or secondary electrochemical oxygen exchange reactions (oxygen reduction and/or oxygen evolution). Known oxygen exchange perovskite catalysts include $La_xCa_{1-x}CoO_3$ and $La_xSr_{1-x}CoO_3$, (where x can range from 0.3 to 0.9). A-site deficiencies, $\gamma$, can lead to oxygen vacancies, $\delta$, through charge neutrality, which in turn can increase ionic conduction, electronic conduction, and/or catalytic activity. Examples of A-site deficient perovskites are $(La_xCa_{1-x})_{1-\gamma}CoO_{3-\delta}$ and $(La_xSr_{1-x})_{1-\gamma}CoO_{3-\delta}$ (where x can range from 0.3 to 0.9 and $\gamma$ can range from 0 to 0.2).

Mixed A-site perovskites in which $A^I$=lanthanum, $A^{II}$=calcium, B=cobalt and x=0.6 ($La_{0.6}Ca_{0.4}CoO_3$) have been shown to have particularly high current density: at 0.6V, up to 280 mA/cm² was observed for oxygen reduction, and at 1.6V, up to 300 mA/cm² was observed for oxygen evolution. The activity of perovskites was recently explained through the concept of the importance of the anti-bonding $e_g$ orbital ($\sigma^*$) electron density in the rate-determining $O_2^{-2}/OH$ exchange reaction. Since the energy and population of the anti-bonding orbital is influenced by the molecular composition, this theory may be used to relate adjustments to the $A^I$, $A^{II}$ and B element ratio to the catalytic activity of a perovskite.

The desirable property of conductivity is also known to be influenced by the character of the $A^{II}$ site; both strontium and calcium on the A-site of the double perovskite $A_2VMoO_6$ produced high conductivity. This finding suggests that alkaline earth metals (e.g., strontium and calcium) are candidates for the $A^{II}$-site in $La_{1-x}A^{II}_xCoO_3$ perovskites.

Many alternative multi-valent B-site cations, such as iron ions, nickel ions, palladium ions, etc. may also be used.

It has also been described how perovskite catalysts may be treated with thermal shock. In a series of tests, the catalytic performance of a $La_{0.6}Ca_{0.4}CoO_3$ perovskite was improved markedly through thermal shock. This was attributed to an increase in surface area, which would in theory increase activity.

A further improvement to the perovskite catalyst may be realized through manipulation of the A-site element population. It is known that double perovskite ($Sr_{-2}VMoO_6$) catalysts demonstrate a pronounced increase in the material conductivity through deliberate manipulation of A-site vacancies (up to 10%). There are also some indications that this effect is present in the lanthanum calcium cobalt oxide system, where thermally induced deficiencies were observed to enhance the catalytic activity of the perovskite.

The Pechini process and glycine nitrate combustion synthesis are two known methods used to produce perovskites. The Pechini process includes dissolving the desired stoichiometric amount of metal nitrate precursors (e.g., lanthanum nitrate, calcium nitrate and cobalt nitrate) and polyethylene glycol in a combination of deionized water and citric acid. The solution is then heated until the water is removed and oxides are formed. The oxides are then calcined to produce the perovskite phase. The alternative glycine nitrate method includes dissolving the same stoichiometric amounts of metal nitrate precursors in deionized water, while supplying heat and adding glycine as the fuel to the mixture. The corresponding high temperature reaction between the nitrates and the glycine has been shown to yield the desired perovskite phase.

Selection of the desired element stoichiometric ratio to be used in a perovskite for a bi-functional catalyst layer may be determined by experiment. For example, metal salts may be combined in various ratios to synthesize catalytic materials that are then incorporated into air electrodes. These electrodes may be used in an experimental plan that includes reasonable ranges of elemental compositions. The results of the experiments may then be used to determine the optimal composition through interpolation or other statistical techniques.

While the above improvements to the activity of perovskite catalysts have been observed, the low absolute conductivity of these materials has prevented their full utilization. As a result, the efficiency of the metal-air electrochemical reaction is typically less than desired.

A suitable substrate, such as a metal foam (e.g., nickel open cell foam) scaffold, may provide connectivity between A-site deficient perovskite catalyst particles, while maintaining a high diffusive flux of oxygen. This arrangement has unexpectedly been found to increase the efficiency of associated metal-air (e.g., zinc-air) energy storage cells. A secondary metal foam mat may be used to further improve conductivity through a coil or flat plate arrangement. In other examples, a porous metal substrate, conductive A-site deficient perovskite in contact with the substrate, and an oxygen and ion permeable ionomer coating the perovskite may be arranged such that air can flow through the assembly and ionomer and air passages are continuous. Other arrangements are, of course, also possible.

With reference to FIG. 1, a conductive perovskite catalyst layer 10 includes a scaffold 12, A-site deficient perovskite catalyst particles 14 in contact with the scaffold 12, and a gas permeable or porous ionomer 16 ionically connecting the particles 14 to a bulk electrolyte 17. Conductive additives 18 may be included, in certain examples, to provide additional current pathways between the particles 14 and scaffold 12. The porosity of the scaffold 12 is such that void spaces (air passages) 20 facilitate the flow of gas therethrough. The scaffold porosity in the example of FIG. 1 is approximately 0.8. The porosity, however, can range from approximately 0.2 to 0.95. A conductive stake 22 may be attached to the scaffold 12 to complete the structure.

Candidate scaffolds include nickel foam, nickel fiber, nickel mesh, punched metal (nickel plated steel), sintered nickel powder, titanium fibers, gold plated structures, platinum plated steel or other metal, carbon foam, carbon fiber, conductive ceramics or conductive plastics. These candidate scaffolds differ substantially from current yttria-stabilized zirconia (YSZ) catalyst substrates used as scaffolds in solid oxide fuel cell electrodes due to the high candidate scaffold conductivity at temperatures less than 500° C.

Candidate gas permeable ionomers include hydrophilic linear polyether polyurethane, cellulostic cast membranes, and ionically conductive membranes such as Nafion® or Fujifilm® type 1 and 2 impregnated and cast with alkali or acid-soluble additives that are subsequently washed out.

Candidate additives include conductive graphite particles, noble metal fibers, noble metal particles, acetylene black, nano-carbon or conductive polymer fibers.

To create an air electrode, a nickel foam substrate (current collector) is cleaned, calendared to a desired thickness by hot rolling, and placed on a tape casting bed. A slurry made of hydrophobic binder, conductive additive and suitable solvent is then mixed and extruded through a doctor blade on to one side of the substrate utilizing standard tape casting procedures. This creates a hydrophobic layer on one side of the nickel foam, which helps reduce water loss to the air stream. Once the hydrophobic layer is dry, the other side of the nickel mesh is utilized as a substrate for the active layer. The active layer slurry may be made from the perovskite (catalyst) powder, binder, conductive additive (if needed) and suitable solvent, and cast onto the nickel foam utilizing the same tape casting procedures. The combination of active layer, nickel foam and hydrophobic layer is then calendared in a hot roller press. A conductive stake may be attached to the substrate as discussed above.

Figure 2:
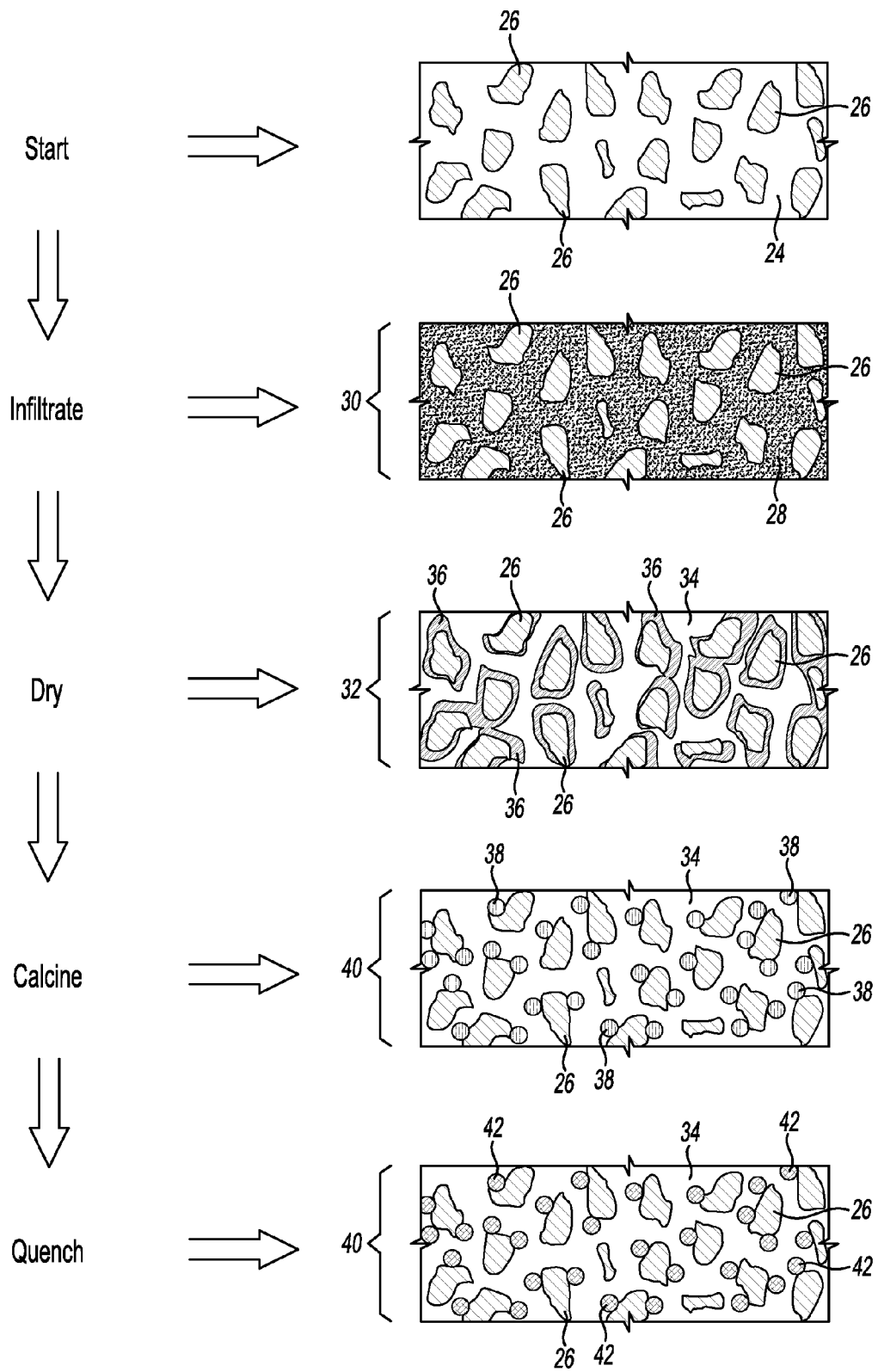
FIG. 2 is a process diagram for the production of a catalyst layer.

Alternatively with reference to FIG. 2, voids 24 of a high temperature stable conductive scaffold 26 may be infiltrated with a mobile phase 28, comprising solvent, citric acid, gelling agent and the target stoichiometric amount of metal salt precursors, such as metal nitrates, to form a percolated scaffold 30. The solvent is typically water and the gelling agent is typically polyethylene glycol. The percolated scaffold 30 is then air-dried to form a green-group scaffold 32 that creates air passages 34 and deposits powder 36. The green-group scaffold 32 is calcined at about 900° C. to develop phase pure perovskite 38 that chemically bonds to the conductive scaffold 26 to form a catalyst layer 40. The calcination may be conducted in either an inert atmosphere, a reducing atmosphere, or an oxidizing atmosphere to promote certain stoichiometries or to preserve the integrity of the scaffold.

In addition, an optional post-calcination quenching process will produce a high surface area, high activity, low electrical resistance perovskite 42. The quench can be accomplished by liquid immersion or by gas cooling (e.g., air, nitrogen, liquid nitrogen). Electrode surfaces may be finished by tape casting a hydrophobic polymeric binder (i.e., spreading a suspension then evaporating any residual solvent) onto one side (the side associated with the GDL) of the catalyst layer 40. The electrode may be further treated by calendaring to a required thickness and density. To complete the air electrode fabrication, a conductive stake may be attached to the substrate as discussed above.

Figure 3:
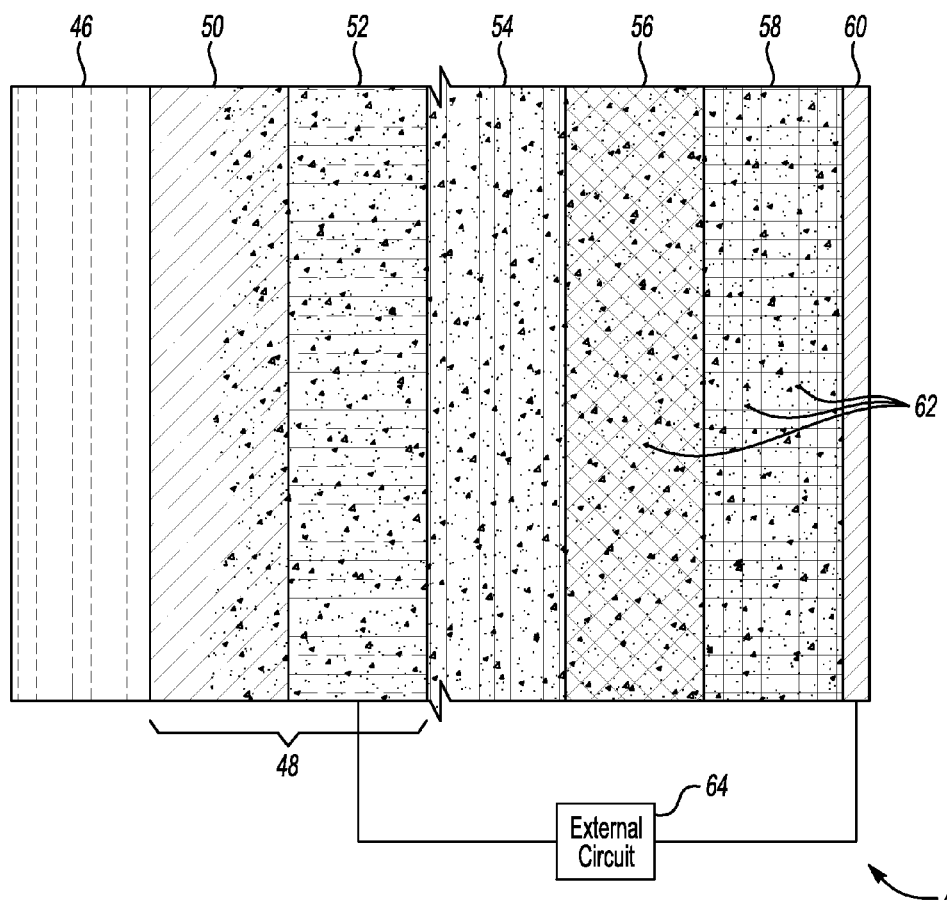
FIG. 3 is a side view, in cross-section, of a membrane electrode assembly with an external circuit.

With reference to FIG. 3, a membrane electrode assembly (MEA) 44 may include a gas diffusion layer (GDL) 46, an air electrode 48 including a hydrophobic layer 50 (e.g., polyvinylidene fluoride), a catalyst layer 52 (similar to the conductive perovskite catalyst structure 10 described with reference to FIG. 1), a separator 54 (e.g., linen, cotton, filter paper) and a reservoir 56 (e.g., filter paper). The MEA 44 may further include a negative electrode 58, current collector 60 (e.g., metal foil, expanded metal) and an electrolyte 62 which forms an ionically conductive bridge from the air electrode 48 to the negative electrode 58. (Components illustrated adjacent to one another are generally in contact with each other.) Other arrangements are also contemplated. The reservoir 56, for example, may be omitted; a solid electrolyte may be used, etc.

The negative electrode 58 may include connected (e.g., fused, sintered, compressed) active material particles, conductive structures in contact with and/or embedded in the active material, and a gas impermeable, ion permeable integument on the active material (and any products of the oxidation of the active material).

Candidate negative electrode active material particles include zinc particles, aluminum particles or lithium particles.

Candidate conductive structures include conductive fibers, conductive nanotubes, a graphite powder, a metal powder, a conductive polymer, metal whiskers, compressed metal fibers, a metal felt or a carbon felt.

Candidate integuments include an ion permeable polymer (e.g., modified polystyrenes, perfluorosulfonic acid) or a metal oxide.

During the discharge reaction, active material of the negative electrode 58 is electrochemically oxidized to release electrons to an external circuit 64. The resulting oxidized active material product is also at least partially dissolved into the electrolyte 62. Contemporaneously at the air electrode 48, electrons from the external circuit 64 electrochemically reduce inflowing oxygen and water from the cell to produce hydroxide ions. The resulting hydroxide ions are diffusively transported to the negative electrode 58 through the electrolyte 62, whereupon they combine with the oxidized active material to form solid oxides and water. The water then diffusively transports to the air electrode 48 to sustain the oxygen reduction reaction. This process continues until the external electrical circuit 64 is interrupted, the active material of the negative electrode 58 is consumed, the air electrode 48 does not receive oxygen, water is removed from the cycle, or hydroxide is removed from the cycle.

During the charge reaction, oxidized materials on the negative electrode 58 are electrochemically reduced by electrons supplied by the external circuit 64. Water from the cell is required for this reaction to occur. The resulting reduced active material is deposited on the negative electrode 58, typically as a metal, while co-produced hydroxide ions are diffusively transported to the air electrode 48. Contemporaneously at the air electrode 48, electrons are provided to the circuit 64 thereby electrochemically oxidizing hydroxide ions to produce oxygen gas and water. The resulting oxygen is typically removed from the cell through diffusive means. The resulting water is diffusively transported to the negative electrode 58 through the electrolyte 62, whereupon it is electrochemically combined with active material oxides of the negative electrode 58 and electrons from the external circuit 64 as above. This process continues until the external electrical circuit 64 is interrupted, the active oxidized material of the negative electrode 58 is consumed, water is removed from the cycle, or hydroxide is removed from the cycle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A secondary air electrode comprising:
    conductive bi-functional catalytic A-site deficient perovskite particles including $A^I$-site lanthanum cations and $A^{II}$-site alkaline earth metal cations;
    an ion and gas permeable ionomer connecting the particles; and
    a conductive scaffold in electrical contact with the particles.

2. The electrode of claim 1 further comprising conductive additives in contact with the particles and scaffold.

3. The electrode of claim 2, wherein the conductive additives are conductive graphite particles, graphite fibers, noble metal fibers, noble metal particles, acetylene black, nano-carbon or conductive polymer fibers.

4. The electrode of claim 1 further comprising a hydrophobic porous layer on the scaffold.

5. The electrode of claim 4, wherein the particles, ionomer, scaffold and layer form a positive electrode.

6. The electrode of claim 1, wherein the $A^{II}$-site alkaline earth metal cations are calcium [II] ions or strontium [II] ions.

7. The electrode of claim 6, wherein the particles include multi-valent B-site cations.

8. The electrode of claim 7, wherein the multi-valent B-site cations are cobalt ions, iron ions, nickel ions or palladium ions.

9. The electrode of claim 1, wherein the particles are chemically bonded to the scaffold.

10. The electrode of claim 1, wherein the conductive scaffold is a porous substrate.

11. The electrode of claim 10, wherein the porous substrate is a metal foam, a carbon foam or a carbon fiber mat.

12. The electrode of claim 10, wherein the porous substrate has a porosity between 0.2 and 0.95.

13. The electrode of claim 1, wherein the conductive scaffold is a mesh.

14. The electrode of claim 1, wherein the conductive scaffold is metal.

15. A positive electrode comprising:
    an electrically conductive scaffold;
    conductive catalytic A-site deficient perovskite particles chemically bonded to the scaffold;
    an ion and gas permeable ionomer connecting the particles; and
    a hydrophobic porous layer on the scaffold.

16. The electrode of claim 15 wherein the conductive catalytic A-Site deficient perovskite particles are bi-functional.

17. The electrode of claim 15 further comprising conductive additives in contact with the particles and scaffold.

18. The electrode of claim 17, wherein the conductive additives are conductive graphite particles, graphite fibers, noble metal fibers, noble metal particles, acetylene black, nano-carbon or conductive polymer fibers.

19. The electrode of claim 15, wherein the conductive scaffold is a porous substrate.

20. The electrode of claim 19, wherein the porous substrate is a metal foam, a carbon foam or a carbon fiber mat.

21. The electrode of claim 19, wherein the porous substrate has a porosity between 0.2 and 0.95.

22. The electrode of claim 15, wherein the conductive scaffold is a mesh.

23. The electrode of claim 15, wherein the conductive scaffold is metal.

* * * * *